(12) United States Patent
Hara et al.

(10) Patent No.: US 11,641,039 B2
(45) Date of Patent: May 2, 2023

(54) VEHICLE BATTERY TEMPERATURE CONTROL APPARATUS

(71) Applicant: SUBARU CORPORATION, Tokyo (JP)

(72) Inventors: Toshiyuki Hara, Tokyo (JP); Yutaka Yokoyama, Tokyo (JP); Yutaka Sakakura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 29 days.

(21) Appl. No.: 17/345,805

(22) Filed: Jun. 11, 2021

(65) Prior Publication Data

US 2022/0029219 A1 Jan. 27, 2022

(30) Foreign Application Priority Data

Jul. 27, 2020 (JP) .............................. JP2020-126680

(51) Int. Cl.
| | |
|---|---|
| *H01M 10/63* | (2014.01) |
| *H01M 10/613* | (2014.01) |
| *H01M 10/625* | (2014.01) |
| *H01M 10/6563* | (2014.01) |

(52) U.S. Cl.
CPC ......... *H01M 10/63* (2015.04); *H01M 10/613* (2015.04); *H01M 10/625* (2015.04); *H01M 10/6563* (2015.04); *H01M 2220/20* (2013.01)

(58) Field of Classification Search
CPC .. H01M 10/63; H01M 10/613; H01M 10/625; H01M 10/6563
See application file for complete search history.

(56) References Cited

FOREIGN PATENT DOCUMENTS

| JP | 2005-248833 A | 9/2005 | |
|---|---|---|---|
| JP | 2005248833 A | * 9/2005 | ............... B60K 6/28 |

* cited by examiner

*Primary Examiner* — Karie O'Neill Apicella
(74) *Attorney, Agent, or Firm* — McGinn I.P. Law Group, PLLC.

(57) ABSTRACT

A vehicle battery temperature control apparatus includes a battery temperature detector, first and second ducts, an exhaust pipe, a heat receiver, a blower fan, and a processor. The processor causes the blower fan to rotate in one of opposite directions, thereby introducing cooling air from the first duct into a battery compartment, and emitting the cooling air that has cooled a battery to the outside via the second duct, if the battery temperature is higher than a first set temperature, and causes the blower fan to rotate in the other direction, thereby introducing air raised in temperature by exchanging heat with the exhaust pipe through the heat receiver from the second duct into the battery compartment, and emitting the air that has raised the temperature of the battery to the outside via the first duct, if the battery temperature is lower than a second set temperature.

16 Claims, 7 Drawing Sheets

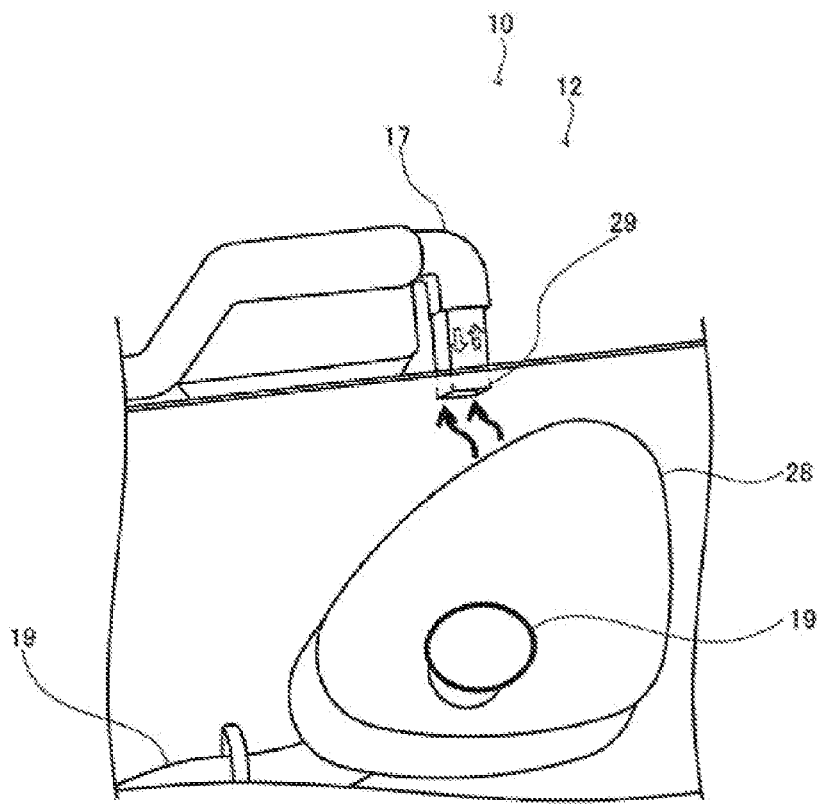
FIG. 6
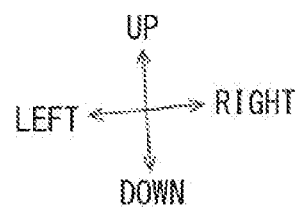

VEHICLE BATTERY TEMPERATURE CONTROL APPARATUS

CROSS-REFERENCE TO RELATED APPLICATIONS

The present application claims priority from Japanese Patent Application No. 2020-126680 filed on Jul. 27, 2020, the entire contents of which are hereby incorporated by reference.

BACKGROUND

The technology relates to a vehicle battery temperature control apparatus.

An electrically driven vehicle is mounted with a storage battery that stores electric power for traveling. The storage battery has its temperature managed, and the temperature is controlled to fall within a constant temperature range. For example, the storage battery is raised in temperature such that its temperature does not become less than a lower limit temperature, and is cooled such that its temperature does not become greater than an upper limit temperature. In some cases, output from the storage battery is restricted in accordance with a temperature situation of the storage battery.

Japanese Unexamined Patent Application Publication (JP-A) No. 2005-248833 discloses a technique of raising temperature of a battery by using exhaust heat. In the technique, air around a filter in an exhaust route becomes hot during regeneration of the filter, and the air is taken in from an air inlet by rotation of a fan and is introduced into a battery chamber as warm air through a fluid passage, to be used for warming-up and heating of a hybrid battery. This makes it possible to efficiently avoid a drop or instability of battery output, without additionally providing a dedicated heating unit.

SUMMARY

An aspect of the technology provides a vehicle battery temperature control apparatus configured to control temperature of a battery housed in a battery compartment of a vehicle provided with a prime mover. The vehicle battery temperature control apparatus includes a battery temperature detector, a first duct, a second duct, an exhaust pipe, a heat receiver, a blower fan, and a processor. The battery temperature detector is configured to detect the temperature of the battery. The first duct is configured to fluidly connect the battery compartment and outside. The second duct is separate from the first duct and configured to fluidly connect the battery compartment and the outside. The second duct has a first end and a second end opposite to the first end. The exhaust pipe is configured to allow exhaust gas emitted from the prime mover to flow therethrough. The heat receiver is provided in an intermediate region between the first end and the second end of the second duct and configured to receive heat generated from the exhaust pipe. The blower fan is configured to rotate in a first direction, thereby introducing cooling air from the first duct into the battery compartment, and emitting the cooling air that has cooled the battery by exchanging heat with the battery to the outside via the second duct, and configured to rotate in a second direction, thereby introducing air raised in temperature by exchanging heat with the exhaust pipe through the heat receiver from the second duct into the battery compartment, and emitting the air that has raised the temperature of the battery to the outside via the first duct. The second direction is a direction opposite to the first direction. The processor is configured to cause the blower fan to rotate in the first direction in a case where the temperature of the battery is higher than a predetermined first set temperature, and to cause the blower fan to rotate in the second direction in a case where the temperature of the battery is lower than a predetermined second set temperature.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

FIG. 6 is a rear view of a configuration of an end of the second duct in the vehicle battery temperature control apparatus according to one example embodiment of the technology.

DETAILED DESCRIPTION

In the technique disclosed in JP-A No. 2005-248833, if a route of a dedicated duct from the exhaust route to the battery chamber is long, air is cooled by this route, which makes it difficult to effectively raise temperature of the storage battery.

Providing a battery heater or a temperature control unit makes it possible to control the temperature of the storage battery to a constant temperature range. However, mounting dedicated equipment for temperature control of the storage battery can result in increased cost and deterioration of fuel economy performance, for example.

It is desirable to provide a vehicle battery temperature control apparatus that effectively performs temperature-raising and cooling of a battery.

In the following, a vehicle battery temperature control apparatus according to some example embodiments of the technology is described with reference to the accompanying drawings. The following may use a front-rear direction, an up-down direction, and a left-right direction for description. The "left" and the "right" may refer to the left and the right in a case where a vehicle 10 is viewed from the rear. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
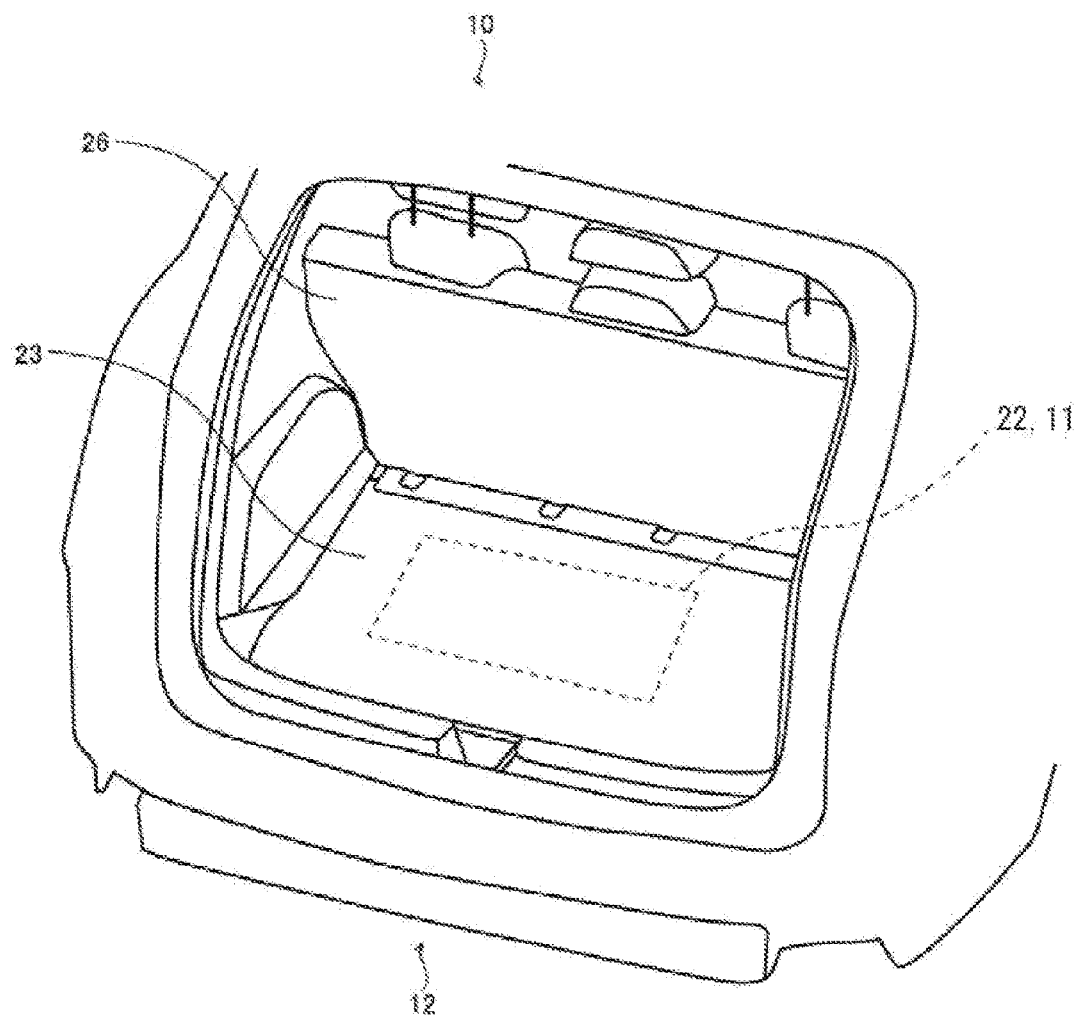
FIG. 1 is a perspective view of a vehicle including a vehicle battery temperature control apparatus according to one example embodiment of the technology.
Figure 1:
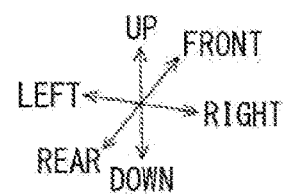

FIG. 1 is a perspective view of the vehicle 10 including a vehicle battery temperature control apparatus 12. Examples of the vehicle 10 may include an automobile and a train. The vehicle 10 may be mounted with a battery 11 configured to supply electric power to a motor and various electrical components. The vehicle 10 may be, for example, an electrical vehicle (EV), a hybrid electrical vehicle (HEV), or a plug-in hybrid electrical vehicle (PHEV). Also in this case, the vehicle 10 may be mounted with the battery 11 having high power storage performance.

FIG. 1 illustrates a state of the vehicle 10 including the vehicle battery temperature control apparatus 12, viewed from above on the rear side, and omits, for convenience of description, a rear gate that covers a rear end of a body of the vehicle 10. Rear seats 26 may be provided on the rear side in a vehicle compartment of the vehicle 10, and a rear floor 23 may be provided further behind the rear seats 26. In a storage space 22 below the rear floor 23, the battery 11 and the vehicle battery temperature control apparatus 12 to be described later may be disposed.

Note that the battery 11 is not limited to being provided below the rear floor 23, and may be provided below, for example, a front floor (unillustrated) where a driver's seat and a passenger seat are provided.

Figure 2:
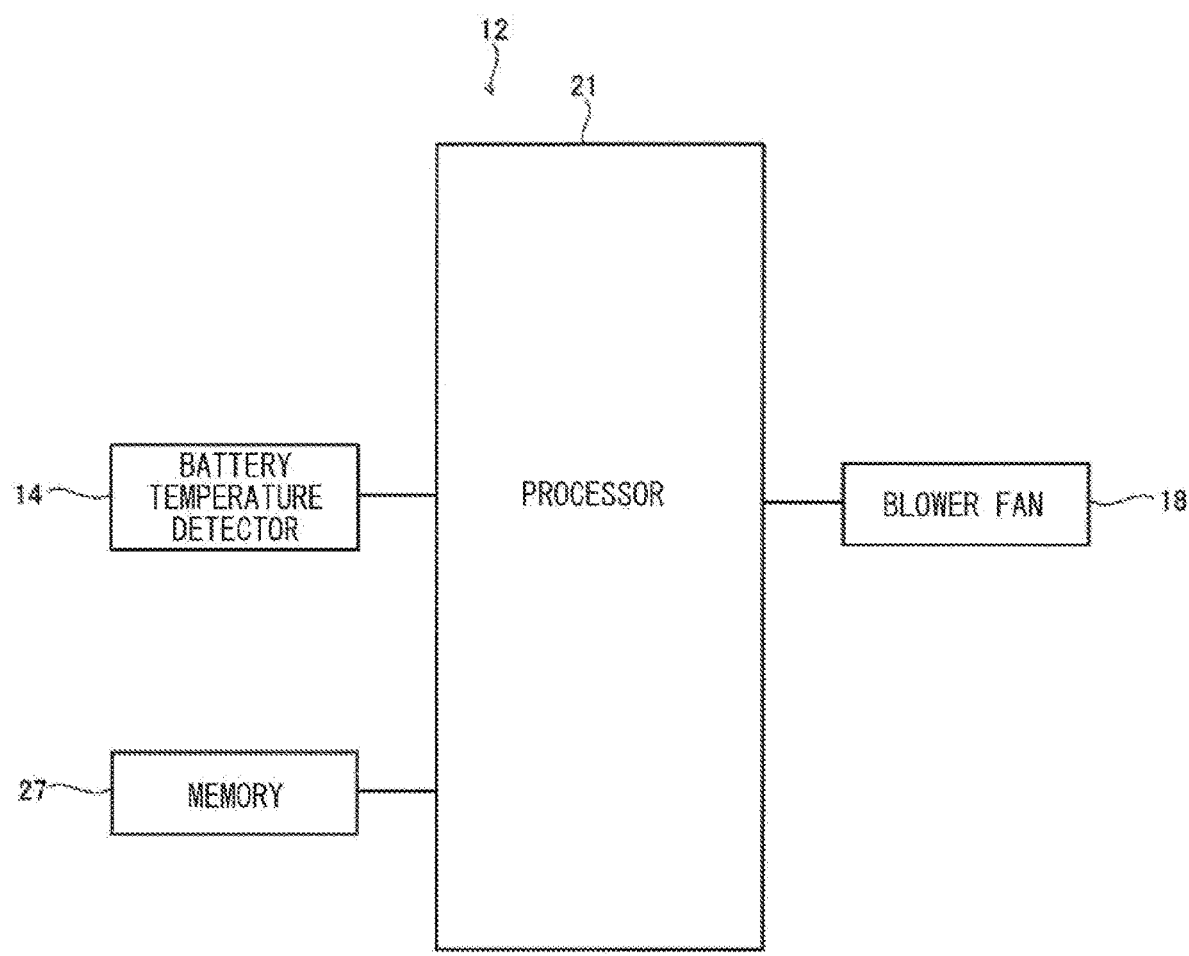
FIG. 2 is a connection diagram illustrating the vehicle battery temperature control apparatus according to one example embodiment of the technology.

FIG. 2 is a connection diagram illustrating the vehicle battery temperature control apparatus 12. The vehicle battery temperature control apparatus 12 may include a processor 21, a battery temperature detector 14, a memory 27, and a blower fan 18.

The processor 21 may be a central processing unit (CPU), for example. An input terminal of the processor 21 may be coupled to the battery temperature detector 14 and the memory 27, and an output terminal of the processor 21 may be coupled to the blower fan 18. The processor 21 may control operation of the blower fan 18, on the basis of input information inputted from the battery temperature detector 14 and the memory 27.

The battery temperature detector 14 may detect temperature of the battery 11 to be described later, and input a result of the detection to the processor 21.

The memory 27 may be a random access memory (RAM) or a read-only memory (ROM). The memory 27 may store a program and parameters, for example, for operation of the vehicle battery temperature control apparatus 12.

The blower fan 18 may be a blower that blows air to perform cooling or temperature-raising of the battery 11. The blower fan 18 may rotate or stop on the basis of an instruction from the processor 21. As will be described later, the blower fan 18 may be configured to blow air bidirectionally on the basis of the instruction from the processor 21.

Figure 3:
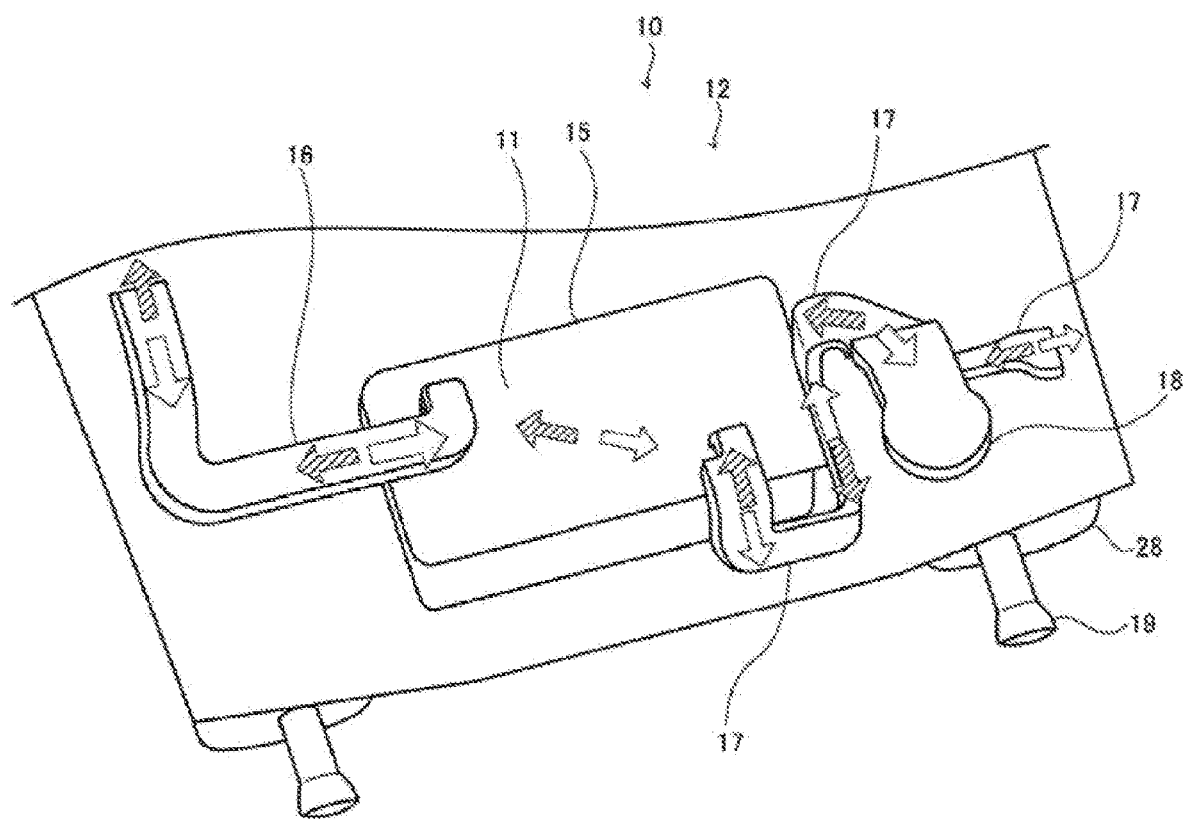
FIG. 3 is a perspective view of the vehicle battery temperature control apparatus according to one example embodiment of the technology.
Figure 3:
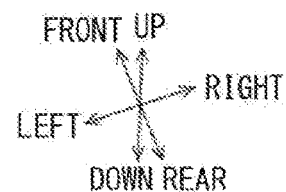

FIG. 3 is a perspective view of the vehicle battery temperature control apparatus 12.

The vehicle battery temperature control apparatus 12 may control the temperature of the battery 11 that is mounted on the vehicle 10 including an engine and supplies electric power to the motor. In one embodiment, the engine may serve as a "prime mover". The vehicle battery temperature control apparatus 12 may mainly include a first duct 16, a second duct 17, the blower fan 18, an exhaust pipe 19, a heat receiver 20, and the processor 21.

The battery 11 may supply current to the motor that gives driving force to the body of the vehicle 10. A secondary battery, such as a nickel metal hydride battery or a lithium ion battery, may be used as the battery 11.

The battery 11 is housed in a battery compartment 15. The battery compartment 15 may be, for example, a substantially box-shaped member including a synthetic resin plate material. The first duct 16 may be fluidly connected with a left portion of the battery compartment 15, and the second duct 17 may be fluidly connected with a right portion of the battery compartment 15. The battery compartment 15 may be a member separate from a body floor. Alternatively, a side surface and a bottom surface of the battery compartment 15 may be configured by the body floor, and a top surface of the battery compartment 15 may be configured by a cover member.

The first duct 16 fluidly connects the outside and the battery compartment 15. The first duct 16 may include a tubular synthetic resin molded into a predetermined shape. A right end of the first duct 16 may be fluidly connected with the battery compartment 15. A left end of the first duct 16 may be fluidly connected to, for example, the vehicle compartment of the vehicle 10.

The second duct 17 is separate from the first duct 16. The second duct 17 fluidly connects the battery compartment 15 housing the battery 11 and the outside. The second duct 17 may include a tubular synthetic resin molded into a predetermined shape. A left end, i.e., a first end, of the second duct 17 may be fluidly connected with the battery compartment 15. An intermediate region of the second duct 17 may be routed along a rear side surface and a right side surface of the battery compartment 15. A right end, i.e., a second end, of the second duct 17 may be open toward the outside.

A portion where the first duct 16 and the battery compartment 15 are fluidly connected with each other and a portion where the second duct 17 and the battery compartment 15 be fluidly connected with each other may be disposed at portions opposed to each other as viewed from above. In one example, the portion where the first duct 16 and the battery compartment 15 are fluidly connected with each other may be disposed on the front left side of the top surface of the battery compartment 15. The portion where the second duct 17 and the battery compartment 15 are fluidly connected with each other may be disposed on the rear right side of the top surface of the battery compartment 15. Thus, for example, it is possible to cause air introduced from the front left side of the battery compartment 15, via the first duct 16, to flow inside the battery compartment 15, and cause the air to be emitted to the outside of the battery compartment 15 via the second duct 17. This makes it possible to control, as a whole, the temperature of the battery 11 stored in the battery compartment 15.

The blower fan 18 may be disposed in the intermediate region of the second duct 17. The blower fan 18 is configured to bidirectionally blow air. By the blower fan 18 rotating forward, it is possible to take in outside air from the first duct 16 and blow it to the battery compartment 15, and to blow the air that has exchanged heat with the battery 11 inside the battery compartment 15 to the outside of the battery compartment 15 through the second duct 17. By the blower fan 18 rotating backward, it is possible to blow outside air from the second duct 17 to the battery compartment 15, and to release the air that has exchanged heat with the battery 11 inside the battery compartment 15 to the outside via the first duct 16.

The exhaust pipe 19 may be a pipe-shaped member through which exhaust gas emitted from the engine flows. In the vicinity of a rear end of the exhaust pipe 19, a main muffler 28 may be provided.

Figure 4:
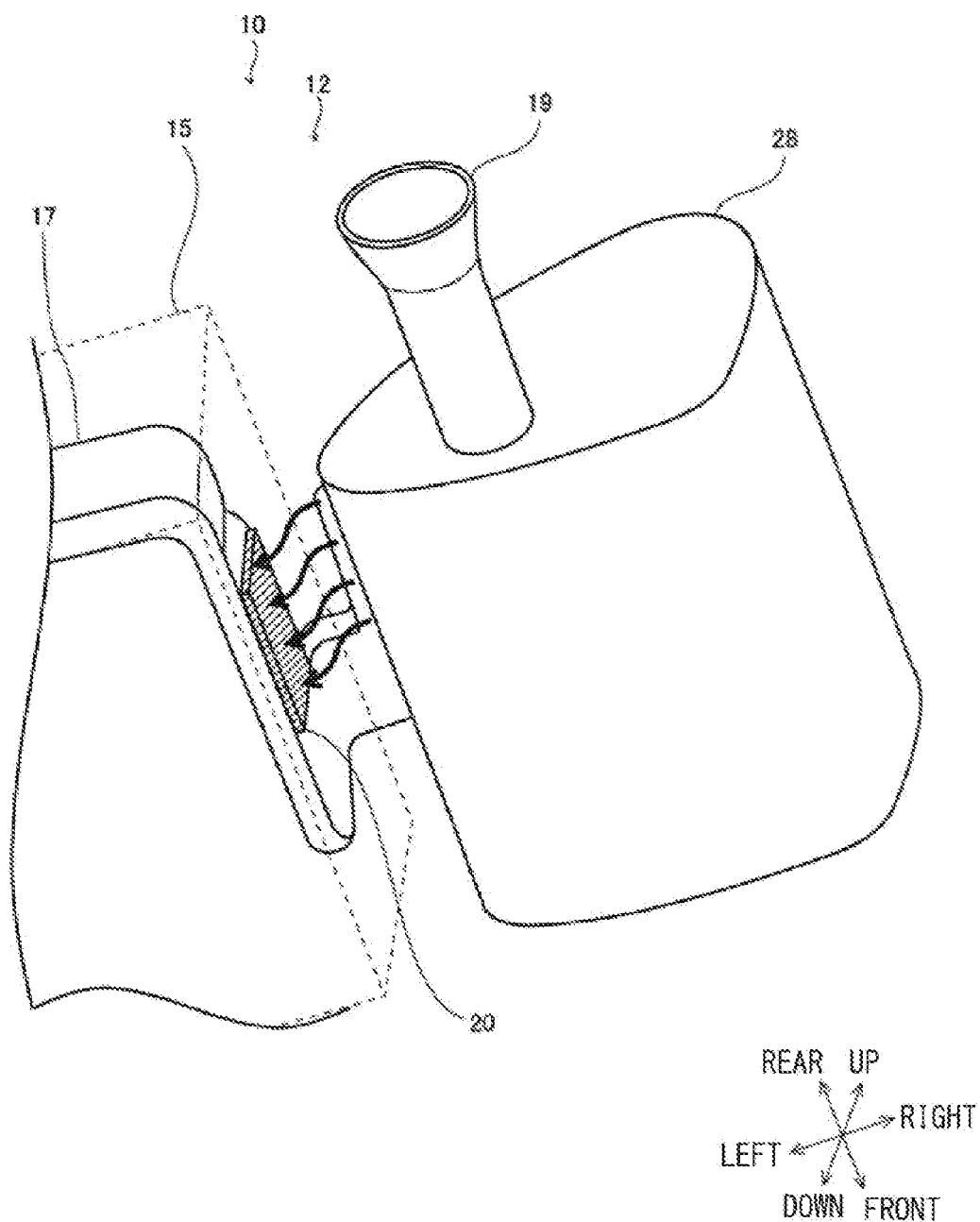
FIG. 4 is a perspective view of a configuration in which a heat receiver is mounted on a second duct in the vehicle battery temperature control apparatus according to one example embodiment of the technology.

FIG. 4 is a perspective view of a configuration in which the heat receiver 20 is mounted on the second duct 17 in the vehicle battery temperature control apparatus 12.

The heat receiver 20 is provided in the intermediate region of the second duct 17, and is configured to receive heat generated from the exhaust pipe 19. In the vicinity of the left side of the main muffler 28, a cross section of the second duct 17 may have a longitudinally long substantially rectangular shape. Thus, it is possible to make a side surface of the second duct 17 facing the exhaust pipe 19 large. The heat receiver 20 may be mounted on the side surface of the second duct 17 facing the exhaust pipe 19. As the heat receiver 20, a material having higher thermal conductivity than a material included in the second duct 17 may be used. In one example, a metal plate of iron or aluminum, for example, formed into a substantially rectangular shape may be used as the heat receiver 20. In this example, the heat receiver 20 may be disposed nearest to the left side of the main muffler 28. The heat receiver 20 may be in proximity to the main muffler 28 of the exhaust pipe 19, via the battery compartment 15.

The heat receiver 20 may be mounted on the second duct 17 through insert molding together with the second duct 17. The heat receiver 20 may configure a portion of the side surface of the second duct 17, or may be attached on the outside of the side surface of the second duct 17.

Providing the heat receiver 20 enables heat generated from the main muffler 28 at the time of gas exhaustion to be favorably conducted to the heat receiver 20, via the side surface of the battery compartment 15. In addition, air flowing through the second duct 17 is raised in temperature by the heat receiver 20. Thus, by blowing temperature-raised air to the battery compartment 15, it is possible to raise the temperature of the battery 11 favorably, without preparing a dedicated heat source, as will be described later.

Description will now be given on methods of performing the cooling and the temperature-raising of the battery 11 by the vehicle battery temperature control apparatus 12, with reference to FIG. 3 and FIG. 4.

Described first is the method of cooling the battery 11. Unhatched arrows in FIG. 3 indicate flow of air when cooling the battery 11. If the detected temperature of the battery 11 detected by the vehicle battery temperature control apparatus 12 is higher than a predetermined first set temperature T1, the processor 21 causes the blower fan 18 to rotate in a first direction. The first set temperature T1 may be 50° C., for example. Thus, for example, air from the vehicle compartment of the vehicle 10 may be blown to the battery compartment 15 via the first duct 16. The air blown to the battery compartment 15 may cool the battery 11 by exchanging heat with the battery 11. The air that has cooled the battery 11 may be released to the outside of the vehicle, via the second duct 17. A case where the battery 11 has high temperature is often a case where air temperature is high and the interior of the vehicle 10 is cooled by air conditioning by a vehicle compartment temperature controller. Therefore, blowing air in the vehicle compartment cooled by air conditioning to the battery compartment 15 makes it possible to cool the battery 11 effectively. Alternatively, air cooled by a vehicle cooling apparatus with a refrigeration cycle may be guided from the first duct 16.

The processor 21 may cause the blower fan 18 to rotate in the first direction to cool the battery 11, until the detected temperature of the battery 11 falls below the first set temperature T1. If the detected temperature of the battery 11 falls below the first set temperature T1, the processor 21 may stop the blower fan 18.

Described next is the method of raising the temperature of the battery 11. Hatched arrows in FIG. 3 indicate flow of air when raising the temperature of the battery 11. If the detected temperature of the battery 11 detected by the vehicle battery temperature control apparatus 12 is lower than a predetermined second set temperature T2, the processor 21 causes the blower fan 18 to rotate in a second direction. The second direction may refer to a direction opposite to the first direction described above. The second set temperature T2 may be 10° C., for example.

Thus, air from the outside of the vehicle may be blown to the battery compartment 15 via the second duct 17. In addition, the heat receiver 20 may be disposed in the intermediate region of the second duct 17, as illustrated in FIG. 4. Thus, the heat receiver 20 may be heated by receiving heat from the main muffler 28 heated by exhaust gas of the engine. Air flowing through the second duct 17 may be raised in temperature by exchanging heat with the heat receiver 20. referring to FIG. 3, temperature-raised air may be blown to the battery compartment 15, and by this air exchanging heat with the battery 11, the battery 11 may be raised in temperature. The air that has raised the temperature of the battery 11 may be blown to the outside, for example, into the vehicle compartment, via the first duct 16.

A case where the battery 11 has low temperature is often a case where air temperature is low and the interior of the vehicle 10 also has low temperature. Therefore, blowing air raised in temperature by the exhaust pipe 19 and the battery 11 to the vehicle compartment makes it possible to warm up the vehicle compartment effectively.

The processor 21 may cause the blower fan 18 to rotate in the second direction to raise the temperature of the battery 11, until the detected temperature of the battery 11 exceeds the second set temperature T2. If the detected temperature of the battery 11 exceeds the second set temperature T2, the processor 21 may stop the blower fan 18.

In the above manner, it is possible to make the temperature of the battery 11 fall within, for example, a range of equal to or greater than 10° C. and equal to or less than 50° C., making it possible to suppress a decrease in charge and discharge characteristics of the battery 11.

Figure 5:
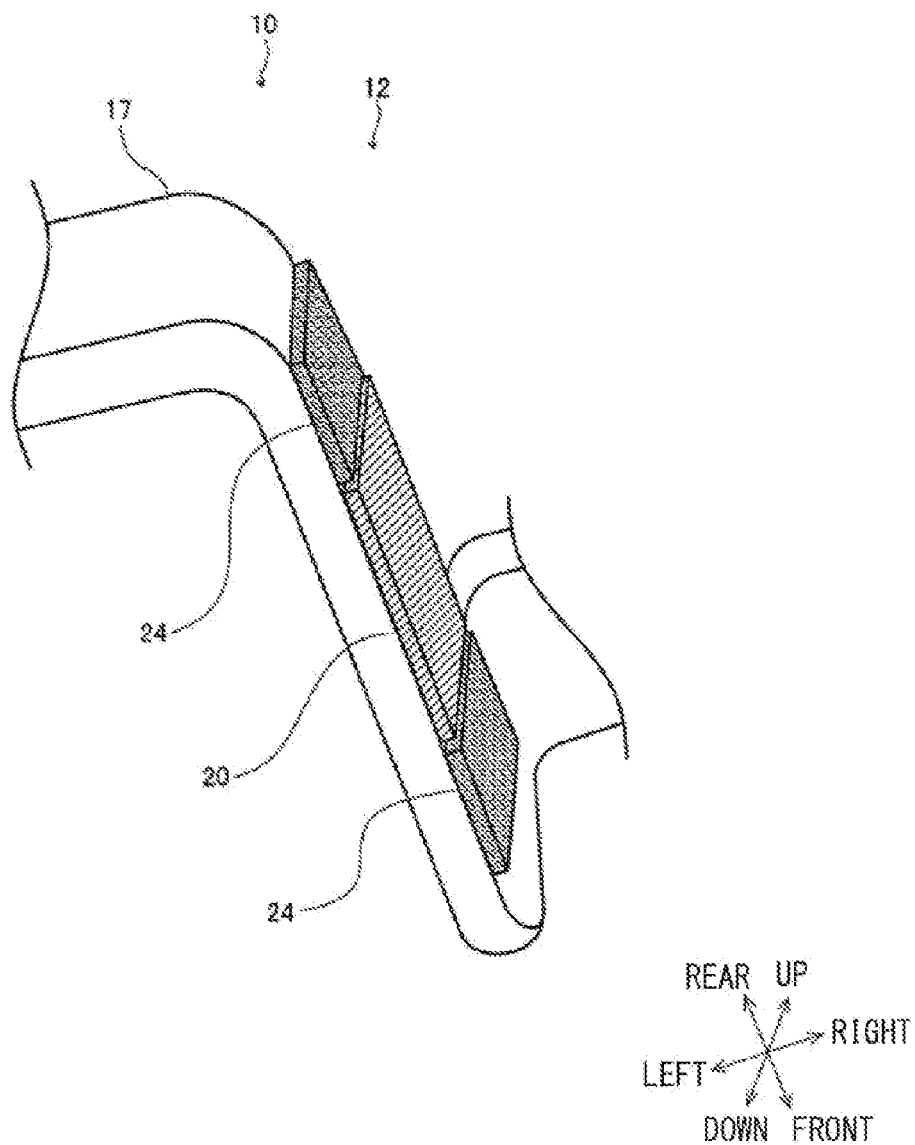
FIG. 5 is a perspective view of a configuration in which the heat receiver and a heat insulator is mounted on the second duct in the vehicle battery temperature control apparatus according to one example embodiment of the technology.

FIG. 5 is a perspective view of a configuration in which the heat receiver 20 and a heat insulator 24 are mounted on the second duct 17 in the vehicle battery temperature control apparatus 12.

In this example, the heat insulator 24 may be disposed between the unillustrated exhaust pipe 19 and battery 11, at a portion other than the heat receiver 20. A material having higher heat insulating property than the second duct 17 or the heat receiver 20, for example, a resin foam of urethane, may be used as the heat insulator 24. As an example, the heat insulator 24 may be disposed at positions sandwiching the heat receiver 20 in a front-rear direction. Disposing the heat insulator 24 makes it possible to suppress excessive heat transfer from the exhaust pipe 19 to the second duct 17, which helps to prevent air flowing through the second duct 17, eventually the battery 11, from being excessively raised in temperature.

FIG. 6 is a rear view of a configuration of an end 29, i.e., the second end, of the second duct 17 in the vehicle battery temperature control apparatus 12.

In this example, the end 29 of the second duct 17 may be disposed in the vicinity of the exhaust pipe 19. In one example, the end 29 of the second duct 17 may be disposed above the main muffler 28 of the exhaust pipe 19. To prevent entry of a foreign substance to the second duct 17 from the outside, a filter may be mounted on the end 29.

With this configuration, when blowing air taken in from the second duct 17 to the battery compartment 15 to raise the temperature of the battery 11, it is possible to take in air heated by the main muffler 28 of the exhaust pipe 19 from the end 29, which makes it possible to raise the temperature of the battery 11 more effectively.

Figure 7A:
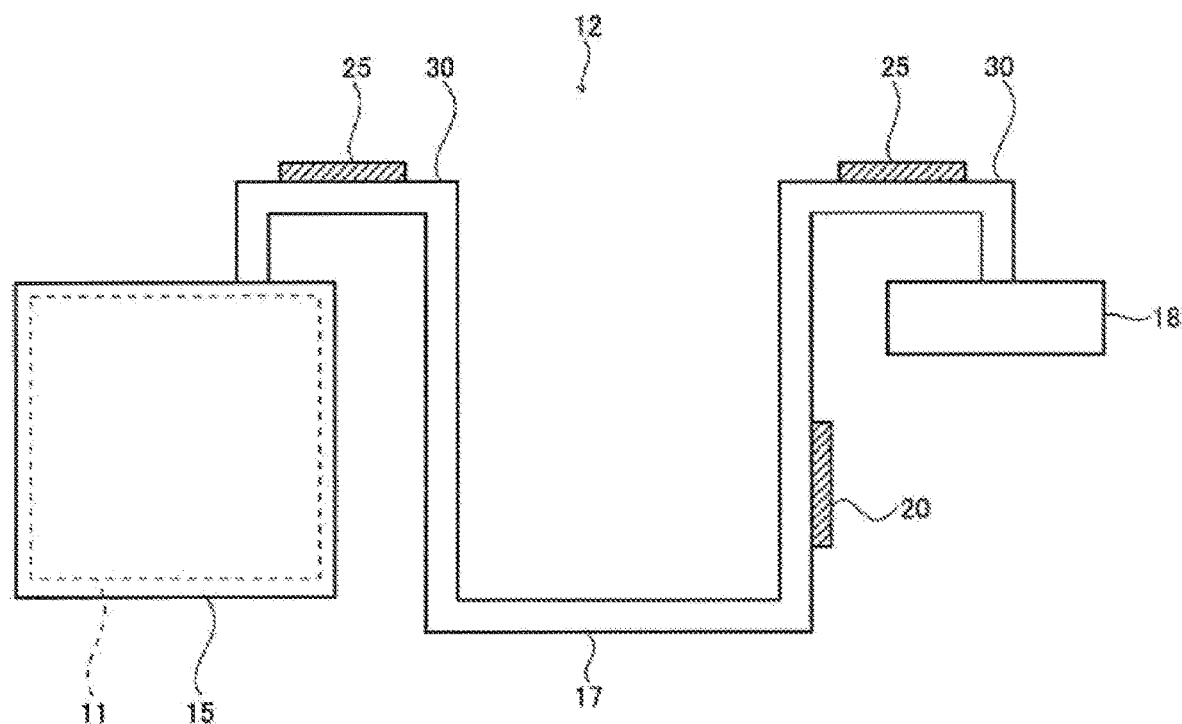
FIG. 7A is a schematic diagram illustrating a configuration in which a heat radiator is mounted on the second duct in the vehicle battery temperature control apparatus according to one example embodiment of the technology.

FIG. 7A is a schematic diagram illustrating a configuration in which a heat radiator 25 is mounted on the second duct 17. In this example, the heat radiator 25 including a material having higher thermal conductivity than a material included in the second duct 17 may be provided in the intermediate region of the second duct 17. In one example, the intermediate region of the second duct 17 may partially be provided with an upward curve 30 curved upward. The heat radiator 25 may be provided on the top surface side of the upward curve 30. The heat radiator 25 and the configuration in which the heat radiator 25 is mounted may be similar to those with the heat receiver 20. For example, two upward curves 30 may be provided, and the heat radiator 25 may be mounted on the top surface of each of the upward curves 30.

Thus, radiating heat through the heat radiator 25 makes it possible to cool air staying in the upward curve 30. In addition, in a case where heat receiving through the heat receiver 20 is performed excessively, radiating heat through the heat radiator 25 makes it possible to suppress excessive temperature rise of the battery 11. This helps to suppress inadvertent temperature rise of the battery 11.

Figure 7B:
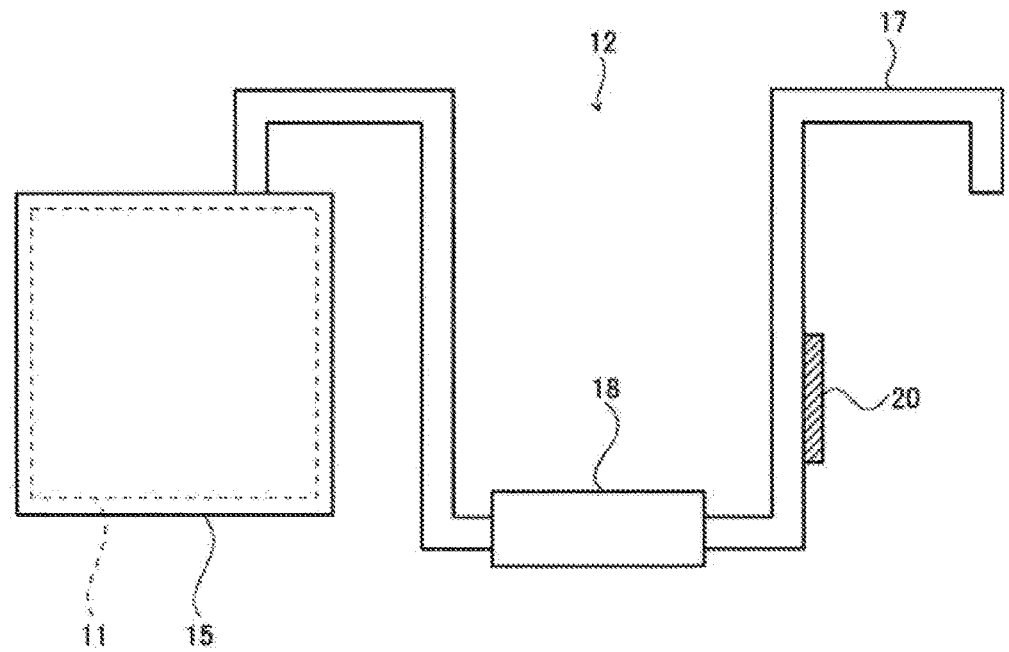
FIG. 7B is a schematic diagram illustrating another example of a position where a blower fan is mounted on the second duct in the vehicle battery temperature control apparatus according to one example embodiment of the technology.

FIG. 7B is a schematic diagram illustrating another example of a position where the blower fan 18 is mounted on the second duct 17. In this example, the blower fan 18 may be disposed in the intermediate region of the second duct 17 to be positioned between the battery 11 and the heat receiver 20. Thus, in a case where the blower fan 18 is stopped, rotating blades housed in the blower fan 18 act like a wall, making it possible to suppress inadvertent heat transfer through the second duct 17.

According to the example embodiments described above, example effects described below are achievable.

According to the example embodiment described above, if the detected temperature of the battery 11 detected by the vehicle battery temperature control apparatus 12 is higher than the first set temperature, the blower fan 18 is caused to rotate in the first direction, thereby introducing cooling air from the first duct 16 into the battery compartment 15, and emitting the cooling air that has cooled the battery 11 to the outside via the second duct 17. This makes it possible to cool the battery 11 to the first set temperature or less. If the detected temperature of the battery 11 detected by the vehicle battery temperature control apparatus 12 is lower than the second set temperature, the blower fan 18 is caused to rotate in the second direction, thereby introducing air raised in temperature by exchanging heat with the exhaust pipe 19 through the heat receiver 20 from the second duct 17 into the battery compartment 15. This makes it possible to raise the temperature of the battery 11 to the second set temperature or more. Thus, it is possible to make the temperature of the battery 11 equal to or less than the first set temperature and equal to or greater than the second set temperature, making it possible to keep discharge characteristics and charge characteristics of the battery 11 at a constant level or more.

In some example embodiments, the heat insulator 24 may be disposed between the battery 11 and the exhaust pipe 19, at a portion other than the heat receiver 20. This makes it possible to suppress excessive heat receiving from the exhaust pipe 19, making it possible to suppress excessive temperature rise of the battery 11.

In some example embodiments, the second end of the second duct 17 may be disposed in the vicinity of the exhaust pipe 19. This makes it possible to take in air raised in temperature by the exhaust pipe 19 from the other end of the second duct 17 to use it for the temperature-raising of the battery 11.

In some example embodiments, the heat radiator 25 including a material having higher thermal conductivity than a material included in the second duct 17 may be provided in the intermediate region of the second duct 17. This makes it possible to radiate heat, through the heat radiator 25, to the outside from air present in the intermediate region of the second duct 17, making it possible to suppress excessive temperature rise of the battery 11.

In some example embodiments, the blower fan 18 may be disposed in the intermediate region of the second duct 17 to be positioned between the battery 11 and the heat receiver 20. Thus, the blower fan 18 that is stopped suppresses flow of air inside the second duct 17. This makes it possible to suppress inadvertent temperature rise of the battery 11 due to movement of air heated by the heat receiver 20 to the battery compartment 15.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof. In addition, the example embodiments described above may be combined with each other as appropriate.

The technical idea understood from the example embodiments described above is described below together with an example effect thereof.

In the vehicle battery temperature control apparatus according to at least one embodiment of the technology, the heat receiver on the second duct and the battery compartment are disposed between the battery and the exhaust pipe. This makes it possible to conduct heat from the exhaust pipe to air inside the second duct, through the heat receiver via the battery compartment.

The processor 21 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 21. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the processor 21 illustrated in FIG. 2.

The invention claimed is:

1. A vehicle battery temperature control apparatus configured to control temperature of a battery housed in a battery compartment of a vehicle provided with a prime mover, the vehicle battery temperature control apparatus comprising:
 a battery temperature detector configured to detect the temperature of the battery;
 a first duct configured to fluidly connect the battery compartment and outside;
 a second duct separate from the first duct and configured to fluidly connect the battery compartment and the outside, the second duct including a first end and a second end opposite to the first end;
 an exhaust pipe configured to allow exhaust gas emitted from the prime mover to flow therethrough;
 a heat receiver provided in an intermediate region between the first end and the second end of the second duct and configured to receive heat generated from the exhaust pipe;
 a blower fan capable of changing a blowing direction of air flowing to exchange heat with the battery;
 a battery temperature detection unit that detects the temperature of the battery;
 an arithmetic control unit that determines a rotation direction of the blower fan based on temperature information detected by the battery temperature detection unit,
 the arithmetic control unit outputs an instruction to rotate the blower fan in a first direction if the battery temperature detected by the battery temperature detection unit is higher than a predetermined first set temperature,
 wherein if the battery temperature detected by the battery detection unit is lower than a predetermined second set temperature, an instruction to rotate the blower fan in a second direction opposite to the first direction is output; and
 a battery temperature control device for the vehicle, comprising the arithmetic control unit for controlling the battery temperature.

2. The vehicle battery temperature control apparatus according to claim 1, further comprising a heat insulator disposed between the battery and the exhaust pipe, at a portion other than the heat receiver.

3. The vehicle battery temperature control apparatus according to claim 1, wherein
 the first end of the second duct is coupled to the battery compartment, and
 the second end of the second duct is disposed in vicinity of the exhaust pipe.

4. The vehicle battery temperature control apparatus according to claim 2, wherein
 the first end of the second duct is coupled to the battery compartment, and
 the second end of the second duct is disposed in vicinity of the exhaust pipe.

5. A vehicle battery temperature control apparatus configured to control temperature of a battery housed in a battery compartment of a vehicle provided with a prime mover, the vehicle battery temperature control apparatus comprising:
 a battery temperature detector configured to detect the temperature of the battery;
 a first duct configured to fluidly connect the battery compartment and outside;
 a second duct separate from the first duct and configured to fluidly connect the battery compartment and the outside, the second duct having a first end and a second end opposite to the first end;
 an exhaust pipe configured to allow exhaust gas emitted from the prime mover to flow therethrough;
 a heat receiver provided in an intermediate region between the first end and the second end of the second duct and configured to receive heat generated from the exhaust pipe;
 a blower fan configured to rotate in a first direction, thereby introducing cooling air from the first duct into the battery compartment, and emitting the cooling air that has cooled the battery by exchanging heat with the battery to the outside via the second duct, and configured to rotate in a second direction, thereby introducing air raised in temperature by exchanging heat with the exhaust pipe through the heat receiver from the second duct into the battery compartment, and emitting the air that has raised the temperature of the battery to the outside via the first duct, the second direction being a direction opposite to the first direction;
 a processor configured to cause the blower fan to rotate in the first direction in a case where the temperature of the battery is higher than a predetermined first set temperature, and to cause the blower fan to rotate in the second direction in a case where the temperature of the battery is lower than a predetermined second set temperature; and
 a heat radiator disposed in the intermediate region of the second duct and including a material having higher thermal conductivity than a material included in the second duct.

6. The vehicle battery temperature control apparatus according to claim 2, further comprising a heat radiator disposed in the intermediate region of the second duct and including a material having higher thermal conductivity than a material included in the second duct.

7. The vehicle battery temperature control apparatus according to claim 3, further comprising a heat radiator disposed in the intermediate region of the second duct and including a material having higher thermal conductivity than a material included in the second duct.

8. The vehicle battery temperature control apparatus according to claim 4, further comprising a heat radiator disposed in the intermediate region of the second duct and including a material having higher thermal conductivity than a material included in the second duct.

9. The vehicle battery temperature control apparatus according to claim 1, wherein the blower fan is disposed in the intermediate region of the second duct to be positioned between the battery and the heat receiver.

10. The vehicle battery temperature control apparatus according to claim 2, wherein the blower fan is disposed in the intermediate region of the second duct to be positioned between the battery and the heat receiver.

11. The vehicle battery temperature control apparatus according to claim 3, wherein the blower fan is disposed in the intermediate region of the second duct to be positioned between the battery and the heat receiver.

12. The vehicle battery temperature control apparatus according to claim 4, wherein the blower fan is disposed in the intermediate region of the second duct to be positioned between the battery and the heat receiver.

13. The vehicle battery temperature control apparatus according to claim 5, wherein the blower fan is disposed in the intermediate region of the second duct to be positioned between the battery and the heat receiver.

14. The vehicle battery temperature control apparatus according to claim 6, wherein the blower fan is disposed in the intermediate region of the second duct to be positioned between the battery and the heat receiver.

15. The vehicle battery temperature control apparatus according to claim 7, wherein the blower fan is disposed in the intermediate region of the second duct to be positioned between the battery and the heat receiver.

16. The vehicle battery temperature control apparatus according to claim 8, wherein the blower fan is disposed in the intermediate region of the second duct to be positioned between the battery and the heat receiver.

\* \* \* \* \*